United States Patent [19]

Fujimoto et al.

[11] Patent Number: 4,864,003
[45] Date of Patent: Sep. 5, 1989

[54] BLOCK-GRAFT POLYMER AND PROCESS FOR PRODUCING IT

[75] Inventors: Teruo Fujimoto; Mikio Shiono; Osamu Watanabe, all of Nagaoka; Koichi Ito, Higashikurume, all of Japan

[73] Assignee: Shin-Etsu Chemical Co., Ltd., Tokyo, Japan

[21] Appl. No.: 229,738

[22] Filed: Aug. 1, 1988

Related U.S. Application Data

[63] Continuation of Ser. No. 30,075, Mar. 25, 1987, abandoned.

Foreign Application Priority Data

Mar. 26, 1986 [JP] Japan ............................ 61-069367

[51] Int. Cl.$^4$ ............................................ C08F 275/00
[52] U.S. Cl. ................................ 525/288; 525/105; 525/375; 525/385
[58] Field of Search ................ 525/105, 288, 385, 375

[56] References Cited

U.S. PATENT DOCUMENTS

| | | | |
|---|---|---|---|
| 3,929,850 | 12/1975 | Streck et al. | 525/105 |
| 4,291,136 | 9/1981 | Keogh | 525/288 |
| 4,396,751 | 8/1983 | Kampf et al. | 525/288 |

*Primary Examiner*—Melvyn I. Marquis
*Attorney, Agent, or Firm*—Foley & Lardner, Schwartz, Jeffery, Schwaab, Mack, Blumenthal & Evans

[57] ABSTRACT

Disclosed are a block-graft copolymer comprising a polymer block having a repetitive unit represented by General Formula:

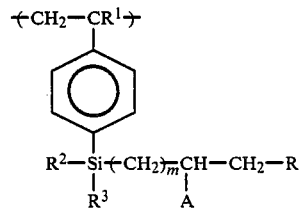

wherein A represents an organopolysiloxane chain, a polyalkylene oxide chain, a polyalkylene-imine chain, a polyacrylate chain or a polyacryloyl chain, and a process for producing the same. This block-graft copolymer can have various performances such as an oxygen enrichment performance, an ion concentration property, a capability of forming a complex with a metal salt and a biocompatibility, depending on the kind of graft polymer chains.

14 Claims, 5 Drawing Sheets

BLOCK-GRAFT POLYMER AND PROCESS FOR PRODUCING IT

This application is a continuation, of application Ser. No. 030,075, filed Mar. 25, 1987, now abandoned.

BACKGROUND OF THE INVENTION

1. Field of the Invention

This invention relates to a block-graft copolymer useful as a material for various functional membranes including an oxygen enrichment membrane.

2. Description of the Prior Art

At present, many attempts are made on the development of function polymer materials used for various purposes.

Dimethylpolysiloxane is known as a material for high enrichment of oxygen, but, when used in the form of a thin membrane, it can not stand use because of its weak cohesion. For this reason, it is attempted to form the material as a block copolymer to remedy its disadvantage. However, the block copolymer, although useful for increasing mechanical strength, can only afford to expect the oxygen enrichment and permeability corresponding only to the proportion held by dimethyl polysiloxane, raising a problem that the oxygen enrichment performance decreases in proportion thereto.

Polyethylene oxide, polyethylene-imine and the like are capable of forming a complex with a salt of metals such as lithium, sodium and uranium, and attempts have been made on how to practically separate these metal salts. However, no practical means for the separation is available at present.

Dimethylpolysiloxane, polyethylene oxide and polymers having an amino group or carboxyl group have biocompatibility, and some of them are used as biomedical materials such as antithrombrogenic materials, bioseparator materials and cell culturing materials. In particular, recently noted are polymeric materials, particularly block copolymers, containing the above dimethylpolysiloxane or polyethylene oxide as a component, which is a multiphase polymer with clear micro domain structure. However, in order to obtain the block copolymer finely divided into multiphases, no other way is available than producing it according to a living anionic polymerization method, and yet this method may restrict the manner of combination of monomers. Moreover, since the domain size of microphase-separated gyration is governed by the radius of inertia, there is a problem that the domain size in the block copolymer can be controlled only with difficulty.

Polyoxyethylene oxide and so forth have attracted notices as solid electrolytes since they are capable of forming a complex with an alkali metal salt as mentioned above. However, the polyethylene oxide, for example, starts to crystalize even in the form of a complex when it has a polymerization degree of 20 or more, to lower the performance as a solid electrolyte. Accordingly, there is a problem that the performance as a solid electrolyte can not be enhanced by making the molecular weight larger.

SUMMARY OF THE INVENTION

An object of this invention is to provide a highly functional polymeric material that can solve these problems.

This invention provides a block-graft copolymer comprising:

a polymer block having a repetitive unit represented by General Formula (I):

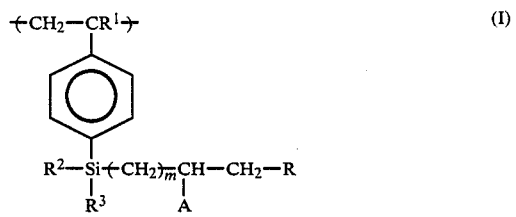

wherein $R^1$ represents hydrogen atom, methyl group or ethyl group; $R^2$ and $R^3$ may be the same or different and each represent an alkyl group having 1 to 3 carbon atoms or phenyl group; R represents n-butyl group, cumyl group or benzyl group; m represent an integer of 0 to 4; and A represents any one selected from the group consisting of polymeric residual groups represented by General Formulas (II) to (V) shown below:

wherein $R^4$ may be the same of different and each represent methyl group, ethyl group or phenyl group; $R^5$ is as defined for $R^4$ or represents a group represented by the formula $-Si(R^4)_3$; and n is an integer of 3 to 1,000,

wherein $R^6$ represents an alkylene group having 2 to 4 or 6 carbon atoms; $R^7$ represents hydrogen atom, an alkyl group having 1 to 4 carbon atoms, vinyl group or phenyl group; and n is as defined above,

wherein $R^8$ represents an alkylene group having 2 to 4 carbon atoms; $R^9$ represents hydrogen atom or an alkyl group having 1 to 6 carbon atoms; and n is as defined above,

wherein $R^{10}$ represents hydrogen atom or methyl group; B represents a group of $-COOR^2$, where $R^2$ is as defined above, or $-CN$; and n is as defined above, and preferably having a polymerization degree of 10 or more;

and at least one of polymer blocks having a repetitive unit represented by General Formula (VI):

wherein $R^{11}$ represents hydrogen atom, methyl group or ethyl group; M represents at least one selected from the group consisting of a group represented by the formula —CH=CH$_2$, —C(CH$_3$)=CH$_2$, —COOCH$_3$ or —COOC$_2$H$_5$ and phenyl group, and having preferably a polymerization degree of 300 or more.

The block-graft copolymer obtained in this invention is characterized by a clear microphase structure, and functions that can answer purposes can be imparted to the backbone chain and the graft polymer chains or branched polymer chains (which is hereinafter referred to simply as "side chains") which are in a microphase-divided form. In particular, mechanical strength and a function of cohesion of the block-graft copolymer can be imparted to the backbone chain, and oxygen enrichment performance, ion concentration property, capability of forming a complex with a metal salt and affinity for blood or the like can be imparted to the side chain by selecting their kinds, thereby providing a functional polymeric material having a wider field of application and higher performances as compared with conventional graft copolymers.

Speaking specifically according to purposes, dimethylpolysiloxane having a smaller molecular weight may be selected as a side chain of the block-graft copolymer of this invention and attached to the backbone chain in a large quantity, whereby the backbone chain and the side chain can be divided to form micro-phases. Moreover, the oxygen permeability can be increased by increasing the free volume by virtue of the backbone chain. Also, the present inventors have found that polyethylene oxide, polyethylene-imine or a metal salt complex thereof, which are amorphous and have a small molecular weight, may sufficiently dissolve oxygen. These polymeric chains are used as side chains of the block-graft polymer of this invention, whereby it is possible to produce a high oxygen enrichment membrane.

As the backbone chain of the block-graft copolymer of this invention, a hard segment such as polystyrene, poly α-methylstyrene and polymethyl methacrylate or a soft segment such as polydiene capable of being insolubilized by crosslinking is selected, and, as the side chain, a component such as polyethylene oxide and polyethyleneimine capable of forming a complex with an alkali metal salt is selected, whereby not only the mechanical strength of the backbone chain can be increased, but also its insolubility and the clear microphase structure can be utilized to make stationary the polyethylene oxide chain or the like, and also to increase its concentration. Thus, an alkali metal salt separator membrane of high performance can be formed.

The block-graft copolymer of this invention can be also used in various biomedical materials by selecting a component having biocompatibility. In such a case, the position, length and number of the side chain may be controlled to make uniformly dispersed the domain of the clear microphase structure, and also the domain size thereof can be controlled in a wide range. Accordingly, it is possible to select molecular designs according to purposes, and also to eliminate the disadvantage that in the conventional graft polymers the radius of inertia is so small for their molecular weight as to be make a product weak.

Also, in the block-graft copolymer of this invention, polyethylene oxide chains of a small molecular weight can be attached to a part of the backbone chain as side chains in a large quantity. Accordingly, the performance as a solid electrolyte can be exhibited while preventing the injurious crystallization that may occur when polyethylene oxide of a large molecular weight is used.

BRIEF DESCRIPTION OF THE DRAWINGS

FIG. 1 shows a GPC elution curve of a block copolymer before grafted (Example 1);

FIG. 2 shows a GPC elution curve of the block-graft copolymer of this invention, produced in Example 1;

FIG. 3 shows a DSC curve of the block-graft copolymer same as above;

FIG. 4 shows a DSC curve of another block-graft copolymer of this invention, produced in Example 2; and FIG. 5 is an electron microscopic photograph (magnification $10^5 \times$) of a film made of the copolymer of this invention, produced in Example 4.

DETAILED DESCRIPTION OF THE INVENTION

The block-graft copolymer of this invention can be produced by first synthesizing a block copolymer constituting a backbone chain, and then attaching a side chain A to or growing a side chain from a vinyl group pendent from the block copolymer.

The block copolymer used as a starting material is a block copolymer comprising a polymer block having a repetitive unit represented by General Formula (VII):

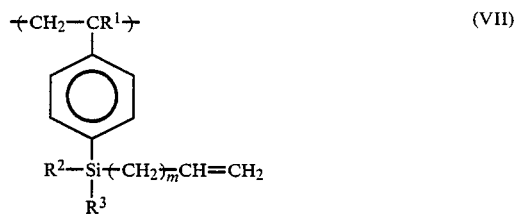

wherein $R^1$, $R^2$, $R^3$ and m have the same meaning as in General Formula (I), and having preferably a polymerization degree of 10 or more; and at least one of polymer blocks having a repetitive unit represented by General Formula (VI) and having preferably a polymerization degree of 300 or more.

An example of the process for producing the block copolymer which is a starting material of this invention and the process for producing the block-graft copolymer of this invention will be described below in sequence. cl Synthesis of block copolymer The block copolymer can be produced by, for example, a process in which an alkenylsilyl group-containing styrene compound represented by General Formula (VIII):

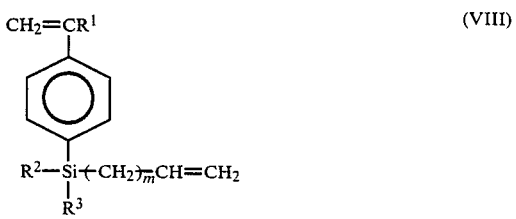

wherein $R^1$, $R^2$, $R^3$ and m are as defined above, and at least one of the compounds represented by General Formula (IX):

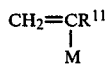 (IX)

wherein $R^{11}$ and M are as defined above,
are successively addition-polymerized according to an anionic polymerization by use of an organic metallic compound as an initiator, wherein at least the polymerization of the alkenylsilyl group-containing styrene compound of General Formula (VIII) is carried out in the presence of N-methylpyrrolidine.

Examples of the compound represented by General Formula (VIII) may include 4-vinylphenyldimethylvinylsilane, 4-vinylphenyldimethylallylsilane, 4-vinylphenyldimethyl-1-butenylsilane, 4-(1-methylethenyl)phenyldimethylvinylsilane, 4-(1-methylethenyl)phenyldimethylallylsilane, 4-vinylphenylmethylethylvinylsilane, 4-vinylphenylmethylphenylvinylsilane and the like, and one of them may be contained in one polymer block. In these compounds of General Formula (VIII), according to the above process, the ethylenically unsaturated group attached to the benzene ring, which is one of the two ethylenically unsaturated groups in the molecule, is predominantly polymerized, and the vinyl group contained in the alkenylsilyl group remains unreacted, whereupon the polymer block consisting of the repetitive unit represented by General Formula (VII) can be formed.

Examples of the monomer compound of General Formula (IX) used for the formation of the other polymer block may include dienes such as butadiene and isoprene; vinyl aromatic hydrocarbon compounds such as styrene and α-methylstyrene; acrylic acid or methacrylic acid esters such as methyl acrylate, methyl methacrylate, ethyl acrylate and ethyl methacrylate; etc.

The organic metallic compound which is an initiator used in the above process may include, for example, organic alkali metals such as cumyl cesium, cumyl potassium, benzyl sodium, benzyl potassium and benzyl cesium, and particularly preferable is cumyl cesium. Amount of the initiator to be used determines the molecular weight of a resulting polymer cojointly with the amount of the monomer compound to be charged. Accordingly, it should be selected depending on the desired molecular weight, and may be usually controlled to give a concentration of the order of $10^{-2}$ to $10^{-4}$ mol/lit. in a reaction mixture.

N-methylpyrrolidine may be used preferably in the range of an equimolar to 10 fold molar amount based on the initiator organic metallic compound. By virtue of N-methylpyrrolidine present in the reaction system, the ethylenically unsaturated group attached to the benzene ring is predominantly polymerized in the course of the polymerization of the alkenylsilyl group-containing compound of General Formula (VIII), and the vinyl group contained in the alkenylsilyl group does not react to remain in the polymer.

The polymerization is, in general, carried out in an organic solvent, and the organic solvent to be used may include ether type solvents such as tetrahydrofuran, dioxane, tetrahydropyran, dimethoxyethane and diglyme, and particularly preferable is tetrahydrofuran. These solvents may be used singly or in combination of two or more of them.

The monomer compound used in the polymerization may be preferably in a concentration of 1 to 10% by weight in a reaction mixture, and the polymerization reaction may be preferably carried out under stirring at a temperature of $-78°$ to $-20°$ C. in a high vacuum of $10^{-5}$ Torr or less or in an atmosphere of an inert gas such as argon and nitrogen from which materials, such as water, injurious to the reaction have been removed by purification.

When initiating the polymerization, the solvent, the initiator, N-methylpyrrolidine and a first monomer compound are charged in a reaction vessel to carry out the reaction usually for about 10 minutes to 1 hour or so, whereby the anionic polymerization may proceed to form the polymer block. Subsequently, a second monomer compound usually diluted with a solvent may be added to the reaction system to allow the polymerization to further proceed, and a third monomer component may be optionally added and polymerized successively in the similar manner. Here, the alkenylsilyl group-containing compound of Formula (VIII) may be used as the first monomer compound, and the compound of General Formula (IX) may be used as the second monomer compound, or these may be used inversely. However, of the compounds of General Formula (IX), acrylate and methacrylate can not be used as the first monomer compound. This is because the terminal anion in the polymer block comprising the acrylate or the like compounds to be formed has so low activity that other monomer compound can not be polymerized to extend another polymer block from its terminal. Accordingly, the polymer block comprising a monomer such as acrylate or methacrylate can be introduced in the block copolymer only as a last block. Assuming as "a" the polymer block comprising the unit of General Formula (VII), and as "b", "b'" and so forth the polymer block comprising the repetitive unit of Formula (VI), a block copolymer of the type such as an ab type, a ba type, a bab type, a bab' type, etc. can be produced as desired, by selecting the order for the monomer compounds to be polymerized under the above conditions.

Upon completion of the necessary polymerization, a terminator such as methanol and ethyl bromide may be added to the reaction system to stop the reaction. The block copolymer thus formed can be purified and separated by pouring the reaction mixture into methanol to precipitate it and washing with methanol, followed by drying.

Yield of the block copolymer thus formed is substantially 100% based on the monomer compounds used, and molecular weight thereof (kinetic molecular weight) can be readily calculated from the weight of the monomer compounds used and the mole number of the initiator. Also, number average molecular weight ($\overline{Mn}$) can be measured using a membrane osmometer, and judgement on whether a desired product has been formed or not can be made based on an infrared (IR) spectrum and $^1H$—NMR spectrum. Evaluation on the molecular weight distribution and on whether a possible precursor of the block copolymer is contained or not can be also made according to gel permeation chromatography (GPC).

Synthesis of block-graft copolymer

The block-graft copolymer of this invention can be obtained by attaching the side chain A to the vinyl group contained in the polymer block having the repetitive unit of General Formula (VII) possessed by the block copolymer synthesized in the above manner. The following two processes can be exemplified as the process for attaching the side chain A to the vinyl group.

Process (1)

This process comprises converting the vinyl group possessed by the above block copolymer into a carbanion by reacting it with an organic alkali metal represented by a general formula RAlk (wherein R is n-butyl, cumyl or benzyl, and Alk is a sodium, lithium, potassium or cesium atom), and, on the other hand, synthesizing a cation-terminated polymer chain according to a cationic polymerization method, and then allowing the former carbanion and the latter cation to ionically couple.

(1) Conversion of vinyl group in block copolymer into carbanion:

The block copolymer is dissolved in a large amount of an ether type solvent such as THF in concentration of about 1 to 20% by weight, preferably of 1 to 10% by weight, to which solution an organic alkali metal dissolved in a suitable solvent is added. For example, a hexane solution containing n-butyl lithium, a THF solution containing cumyl potassium, cumyl cesium, benzyl lithium or benzyl potassium, preferably n-butyl lithium and cumyl cesium, is added at 0° to 25° C., and the mixture is stirred for 30 minutes to 3 hours. At this stage, the vinyl group in the block copolymer is reacted with the organic alkali metal so that the vinyl group is converted into a carbanion. This can be confirmed by subjecting a specimen obtained by precipitating and purifying the product in methanol and thereafter drying for separation, to $^1$H—NMR spectrometry to examine how the vinyl group has disappeared and how the butyl group, cumyl group or benzyl group has increased, whereby it is possible to confirm whether the organic alkali metal is quantitatively reacted with the vinyl group. GPC can also confirm whether the backbone chain does not undergo crosslinking or decomposition reaction.

(2) Synthesis of cation-terminated polymer chain:

Monomers that can polymerize to form a living cation polymer whose cation end is not deactivated include, for example, a compound represented by General Formula (X):

(X)

wherein $R^6$ is as defined above,
and a compound represented by General Formula (XI):

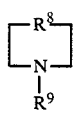
(XI)

wherein $R^8$ and $R^9$ are as defined above.

Examples of the compound of General Formula (X) include, for example, oxetane, tetrahydrofuran, and the like, and examples of the compound of General Formula (XI) include aziridine, N-t-butylaziridine, 1,3,3-trimethylazetidine, N-methylpyrrolidine, and the like.

These compounds are subjected to cationic polymerization using a Friedel-Crafts catalyst such as boron trifluoride, boron trifluoride etherate (($C_2H_5)_2O \cdot BF_3$), triethyloxonium tetrafluoroborate (($C_2H_5)_3O \cdot BF_4$), etc. or an ultra strong acid ester such as ethyl fluorosulfonate ($EtOSO_2F$) and ethyl trifluoromethylsulfonate ($EtOSO_2CF_3$) as an initiator, in a chlorinated hydrocarbon type solvent such as dichloromethane, 1,2-dichloroethane, chloroform and carbon tetrachloride, at 0° to 60° C., for about 1 hour to 10 hours, and preferably with stirring, to obtain a stable cation-terminated polymer.

(3) Ionic coupling:

A mixture of a solution containing the cation-terminated polymer obtained in (2) and a solution containing the block copolymer having carbanions at the terminals of the side chains obtained in (1) is maintained at about −78° to 0° C. for 1 to 3 hours to effect ionic coupling to give a block-graft copolymer. The reaction mixture is poured into a water/methanol system to be precipitated, followed by drying it to obtain an isolated polymer. Yield can be increased by mixing the above two solutions at a temperature as low as possible and maintaining the temperature. The resulting block-graft copolymer can be characterized in the following manner: Number average molecular weight and degree of branching are measured by use of a membrane osmometer; structure and composition are determined by an infrared spectrum and $^1$H—NMR spectrum; and presence of a polymer prior to the coupling reaction is judged by GPC. Also, melting point is measured by use of a differential scanning calorimeter (DSC).

Process (2)

This process comprises converting the vinyl group in the above block copolymer into a carbanion (a carbometal) by reacting it with an equimolar amount of an organic alkali metal, and adding thereto a monomer to allow side chains to grow.

The organic alkali metal usable in this process may include those represented by the formula RAlk mentioned in Process (1), and the monomer compounds may include, for example, a compound represented by General Formula (XII):

(XII)

wherein $R^{10}$ and B are as defined above, a compound represented by General Formula (XIII):

(XIII)

wherein $R^{12}$ represents a hydrogen atom or methyl group,
and a compound represented by General Formula (XIV):

(XIV)

wherein $R^4$ is as defined above; and n' is 3 or 4.

Examples of the compound of General Formula (XII) include methyl methacrylate, methyl acrylate, ethyl acrylate and acrylonitrile; examples of the compound of General Formula (XIII) include ethylene oxide and propylene oxide; and examples of the compound of General Formula (XIV) include hexamethylcyclotrisiloxane, octamethylcyclotetrasiloxane, 1,3,5-trimethyl-1,3,5-triphenylcyclotrisiloxane, and the like.

The block copolymer used in this process, whose vinyl group has been converted into a carbanion, can be prepared in the same manner as mentioned in Process (1).

When polymethacrylate, polyacrylate or polyacrylonitrile is formed as the side chain, the corresponding monomer of General Formula (XII) in the form of a gas or a solution diluted with an ether solvent such as THF may be added at about $-78°$ to $-20°$ C. to a solution of the block copolymer whose vinyl group has been converted into a carbanion in an ether solvent such as THF, followed by stirring for 10 minutes to 1 hour to obtain a desired product.

On the other hand, ethylene oxide or propylene oxide of General Formula (XIII) may be added in the form of a gas, and hexamethylcyclotrisiloxane, octamethylcyclotetrasiloxane or the like of General Formula (XIV) may be added in the form of a solution diluted with THF or the like. In the case of the former ethylene oxide or propylene oxide, stirring may be carried out at 30 to 65° C. for 24 to 48 hours depending on the type of counterions, and in the case of the latter siloxanes, stirring may be carried out at 0° to 65° C. for 24 to 48 hours depending on counterions and monomers, to obtain the desired product.

Characterization may be carried out as follows: Number average molecular weight is measured by use of a membrane osmometer, and structure and composition are determined by infrared spectrum and $^1H$—NMR spectrum. From the results thereof, degree of branching can be determined. Also, GPC can afford to judge whether a desired product has been separated, and presume molecular weight distribution.

EXAMPLES

This invention will be described below in greater detail by Examples, but by no means limited to these.

Synthesis Example 1

Synthesis of poly(styrene-b-4-vinylphenyldimethylvinylsilane, block copolymer of styrene with 4-vinylphenyldimethylvinylsilane In a high vacuum of $10^{-6}$ Torr, 532 ml of tetrahydrofuran, $1.88 \times 10^{-4}$ mole of cumyl cesium as an initiator and $9.78 \times 10^{-4}$ mole of N-methylpyrrolidine were charged into a 1 lit. flask.

To the resulting mixed solution, at $-78°$ C., 12.9 ml of styrene diluted with 85 ml of tetrahydrofuran were added and polymerized for 30 minutes with stirring. The reaction mixture turned red.

Subsequently, 16.7 ml of 4-vinylphenyldimethylvinylsilane diluted with 78 ml of tetrahydrofuran was added thereto. The resulting reaction mixture was stirred for 15 minutes to proceed with the polymerization. This reaction mixture also turned red.

After the polymerization was completed, the reaction mixture was poured into methanol to precipitate and separate the resulting polymer, followed by drying to obtain 25 g of a white polymer.

IR spectrum and $^1H$—NMR spectrum of the resulting polymer were measured to find that it showed the characteristic absorptions as set out below and the GPC elution curve as shown in FIG. 1.

IR ($cm^{-1}$): 820, 1250 ($Si(CH_3)_2$); 1600($SiCH=CH_2$); 700, 770, 835(benzene ring)

$^1H$—NMR ($\delta$, ppm): 0.27($Si(CH_3)_2$); 5.8, 6.0($Si(CH=CH_2)$); 6.5, 7.0(benzene ring)

From $^1H$—NMR, it was confirmed that the polymer comprised 44% of styrene and 56% of 4-vinylphenyldimethylvinylsilane, and, from the GPC elution curve, was found to be a single kind of polymer. This polymer had an $\overline{Mn}$ of $14 \times 10^4$.

Referential Example

Conversion of poly(styrene-b-4-vinylphenyldimethylvinylsilane) into a carbanion

In 100 ml of tetrahydrofuran, 2 g of poly(styrene-b-4-vinylphenyldimethylvinylsilane) obtained in Synthesis Example 1 set out above were dissolved in a high vacuum.

To the resulting solution, $6.0 \times 10^{-3}$ mole of n-butyl lithium was added at 0° C. After this solution was stirred for 1 hour, the reaction mixture was poured into methanol, and a polymer obtained was precipitated and thereafter separated.

This polymer was analyzed according to $^1H$—NMR spectrometry to confirm that n-butyl lithium has combined with the double bond so that the double bond had perfectly disappeared. It was also confirmed by GPC elution curve that the molecular weight distribution remained unchanged from the state where lithium had not combined therewith, and also that neither crosslinking reaction nor decomposition reaction occurred.

This Referential Example shows that the vinyl group of the block copolymer is converted into a carbanion (which is accompanied with lithium as its counterion) with perfectly quantitative proceeding, and without accompanying any side reactions such as decomposition and crosslinking of a backbone chain.

Example 1

Synthesis of block-graft copolymer of poly(styrene-b-4-vinylphenyldimethylvinylsilane) with polytetrahydrofuran (Process (1))

First, two sets of polymerization vessels A and B made of glass and each bearing a breakable seal were prepared. Vessel A was used for polymerization of polytetrahydrofuran, and Vessel B for converting the vinyl group of the block copolymer into a carbanion.

In polymerization of polytetrahydrofuran, a methylene chloride solution as an initiator, containing 0.018 mole of triethyloxonium tetrafluoroborate ($Et_3O^+BF_4^-$), and 100 ml of methylene chloride as a solvent and 14 ml of tetrahydrofuran as a monomer were respectively first introduced into breakable seal-bearing glass vessels, and the respective breakable seal-bearing vessels were connected to polymerization vessel A. Inside of the polymerization system comprised of the vessels thus connected was evacuated to $10^{-6}$ mmHg, and inside of polymerization vessel A was maintained at 0° C. Thereafter, the initiator, the solvent and the monomer were in this order introduced into polymerization vessel A by breaking the breakable seals of the respective vessels, to carry out polymerization for 3 hours.

On the other hand, conversion of poly(styrene-b-4-vinylphenyldimethylvinylsilane) synthesized in Synthesis Example 1 set out above into a carbanion was carried out in the following manner: A hexane solution containing 0.02 mole of n-butyl lithium and 6.7 g of the above block copolymer dissolved in 50 ml of tetrahydrofuran were respectively introduced into breakable seal-bearing glass vessels, and the respective breakable seal-bearing vessels were connected to polymerization vessel B. Inside of the polymerization system thus constructed was evacuated to $10^{-6}$ mmHg and maintained at 0° C. Subsequently, the block copolymer solution and the n-butyl lithium solution were in this order introduced into polymerization vessel B by breaking the breakable seals of the respective vessels, to carry out reaction for 1 hour.

Next, polymerization vessels A and B were connected to each other at the portions to which the respective breakable seals were attached, and the insides of both vessels were evacuated to $10^{-5}$ mmHg and cooled to −78° C., followed by mixing of both solutions and stirring for 3 hours. Thereafter, the reaction mixture was poured into a large quantity of water/methanol (2:8) to precipitate a polymer, which was filtered and then dried. Yield: 12 g.

A GPC elution curve of this polymer is shown in FIG. 2, and a DSC curve in FIG. 3.

Also, this polymer had an $\overline{Mn}$ of $20\times10^4$.

Absorption positions (δ) in $^1$H—NMR spectrum of the side chain thereof:

CH$_2$OCH$_2$: 3.4 ppm; CH$_2$CH$_2$: 1.6 ppm.

Synthesis Example 2

Synthesis of block terpolymer comprising butadiene, 4-vinylphenyldimethylvinylsilane and styrene In a high vacuum of $10^{-6}$ Torr, 970 ml of tetrahydrofuran, $1.30\times10^{-4}$ mole of cumyl cesium as an initiator and $9.5\times10^{-4}$ mole of N-methylpyrrolidine were charged into a 2 lit. flask. To this mixed solution, at −78° C., 8.8 ml of butadiene was added to carry out polymerization for 2 hours with stirring. Subsequently, the reaction mixture was diluted with 80 ml of THF. To the mixture, 13.4 ml of 4-vinylphenyldimethylvinylsilane were added to carry out polymerization for 15 minutes with stirring. The solution formed turned red. Subsequently, 12.2 ml of styrene diluted with 90 ml of THF were added thereto to carry out polymerization for further 10 minutes with stirring. This solution formed also turned red. After the polymerization was completed, the reaction mixture was poured into methanol, and the resulting polymer was precipitated and separated, followed by drying to obtain 28 g of white polymer.

The resulting polymer showed IR and $^1$H—NMR characteristic absorption as follows:

IR (cm$^{-1}$): 905, 990(—CH=CH$_2$); 1640(C=C); 820, 1250(Si(CH$_3$)$_2$); 1600(SiCH=CH$_2$); 700, 770, 835 (benzene ring)

$^1$H—NMR (δ, ppm): 5.4, 5.0(—CH=CH$_2$); 0.27(Si(CH$_3$)$_2$); 5.8, 6.0(SiCH=CH$_2$); 6.5, 7.0(benzene ring)

The $^1$H—NMR spectrum revealed that the polymer was a block copolymer comprising 20% of butadiene, 42% of 4-vinylphenyldimethylvinylsilane and 38% of styrene. Also, the GPC elution curve had a sharp and single peak similar to that shown in FIG. 1, and the polymer was confirmed to be a single kind of polymer. This polymer had an $\overline{Mn}$ of $22\times10^4$.

Example 2

Synthesis of block-graft copolymer of poly(styrene-b-4-vinylphenyldimethylvinylsilane-b-butadiene) with poly(N-t-butylaziridine)

Synthesis of poly(N-t-butylaziridine) was carried out by proceeding with the polymerization in the same manner as in Example 1 except that 14 ml of N-t-butylaziridine were used as the monomer in place of tetrahydrofuran.

Conversion of the vinyl group pendent from a block copolymer into a carbanion was carried out in the same manner as in Example 1 except that 10.6 g of poly-(styrene-b-4-vinylphenyldimethylvinylsilane-b-butadiene) produced in Synthesis Example 2 set out above, dissolved in 80 ml of tetrahydrofuran were used as the block copolymer in place of poly(styrene-b-4-vianylphenyldimethylvinylsilane).

Subsequently, the solution of poly(N-t-butylaziridine) and the solution of the above block copolymer with its pendant group terminated with a carbanion were mixed in a high vacuum at −78° C., and the mixture was stirred for 4 hours.

Thereafter, the reaction mixture was poured into a large quantity of water/methanol (2:8) to precipitate a polymer, which was filtered and then dried. Yield: 18 g.

A GPC elution curve of this polymer had a sharp single peak similar to that shown in FIG. 2, and a DSC curve was as shown in FIG. 4. Also, this polymer had an $\overline{Mn}$ of $22.7\times10^4$.

Absorption positions (δ) in $^1$H—NMR of the side chain thereof:

NC(CH$_3$)$_3$: 1.1 ppm; NCH$_2$CH$_2$: 2.5 ppm.

Example 3

Synthesis of block-graft copolymer of block copolymer poly(styrene-b-4-vinylphenyldimethylvinylsilane) with ethylene oxide (Process (2))

In a high vacuum of $10^{-6}$ mmHg, 2 g of poly(styrene-b-4-vinylphenyldimethylvinylsilane) produced in Synthesis Example 1, were dissolved in 70 ml of tetrahydrofuran.

To this solution, 100 ml of tetrahydrofuran were added as a solvent, and the $6.0\times10^{-3}$ mole of n-butyl lithium was added. The solution thus formed was stirred at 0° C. for 1 hour, followed by addition of 10 ml of ethylene oxide.

The solution formed was maintained at 65° C. for 24 hours under stirring. After 24 hours, the reaction mixture was poured into ethyl ether to precipitate a polymer, which was separated and dried. The polymer was obtained in amount of 10 g, and, from the GPC elution curve comprising a sharp and single peak similar to that shown in FIG. 2, was confirmed to be a single kind of polymer. Also, this polymer had an $\overline{Mn}$ of $17\times10^4$.

Absorption positions in IR and $^1$H—NMR spectra of the side chain thereof:

IR (cm$^{-1}$): C—O—C: 1115

$^1$H—NMR (δ, ppm): OCH$_2$CH$_2$: 3.6

Example 4

Synthesis of block-graft copolymer of block copolymer poly(styrene-b-4-vinylphenyldimethylvinylsilane) with dimethylsiloxane (Process (2))

Procedures prior to the stage where n-butyl lithium was added to the solution of the block copolymer in Example 3 were right repeated to obtain a solution, to which 100 ml of THF was added as a solvent, and $6.0 \times 10^{-3}$ mole of n-butyl lithium was further added. The solution was stirred at 0° C. for 1 hour, followed by addition of 5 g of hexamethylcyclotrisiloxane diluted with 43 ml of tetrahydrofuran. The solution formed was stirred at 25° C. for 24 hours.

After the polymerization was completed, the reaction mixture was poured into methanol to precipitate a polymer, which was separated and dried to obtain 6 g of dried white polymer. This polymer had an $\overline{Mn}$ of $24 \times 10^4$, and, from the GPC elution curve comprising a sharp and single peak similar to that shown in FIG. 2, was confirmed to be a single kind of polymer, and also was found that grafting of the side chains had been carried out in an ideal state.

A film of this block-graft copolymer was prepared from a benzene solution, and an observation thereof by an electron microscope is shown in FIG. 5. FIG. 5 shows clear lamella structures with white bands corresponding to polystyrene and dark bands corresponding to polydimethylsiloxane.

Absorption positions in IR and $^1$H—NMR spectra of the side chain thereof:

IR: Si(CH$_3$)$_2$: 820, 1260 cm$^{-1}$; SiOSi: 1040 cm$^{-1}$
$^1$H—NMR: Si(CH$_3$)$_2$: 0.04 ppm

What we claim is:

1. A block-graft copolymer comprising:
a polymer block having a repetitive unit represented by General Formula (I):

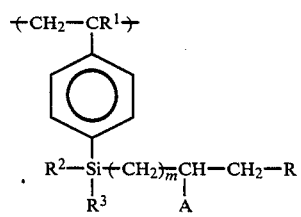
(I)

wherein R$^1$ represents a hydrogen atom, methyl group or ethyl group; R$^2$ and R$^3$ may be the same or different and each represent an alkyl group having 1 to 3 carbon atoms or phenyl group; R represents n-butyl group, cumyl group or benzyl group; m represent an integer of 0 to 4; and A is selected from the group consisting of polymeric residual groups represented by General Formulas (II) to (V) shown below:

$$\pm\text{SiO}\overline{)_{\overline{n}}}\text{R}^5 \quad (II)$$
$$\begin{array}{c} \text{R}^4 \\ | \\ \text{R}^4 \end{array}$$

wherein R$^4$ may be the same or different and each represent methyl group, ethyl group or phenyl group; R$^5$ is as defined for R$^4$ or represents a group represented by the formula —Si(R$^4$)$_3$; and n is an integer of 1 to 1,000, $$\pm\text{R}^6\text{O}\overline{)_{\overline{n}}}\text{R}^7 \quad (III)$$

wherein R$^6$ represents an alkylene group having 2 to 4 or 6 carbon atoms; R$^7$ represents a hydrogen atom, an alkyl group having 1 to 4 carbon atoms, vinyl group or phenyl group; and n is as defined above,

(IV)

wherein R$^8$ represents an alkylene group having 2 to 4 carbon atoms; R$^9$ represents a hydrogen atom or an alkyl group having 1 to 6 carbon atoms; and n is as defined above, and

(V)

wherein R$^{10}$ represents a hydrogen atom or methyl group; B represents —COOR$^2$, where R$^2$ is as defined above, or —CN; and n is as defined above;
and at least one polymer block having a repetitive unit represented by General Formula (VI):

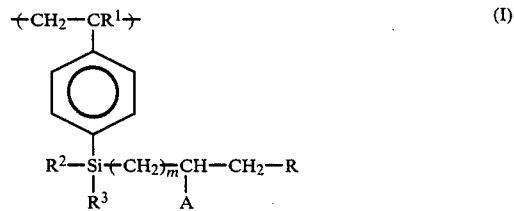
(VI)

wherein R$^{11}$ represents a hydrogen atom, methyl group or ethyl group; M is selected from the group consisting of —CH=CH$_2$, —C(CH$_3$)=CH$_2$, —COOCH$_3$, —COOC$_2$H$_5$ and phenyl group.

2. A process for producing a block-graft copolymer comprising a polymer block having a repetitive unit represented by General Formula (I):

(I)

wherein R$^1$ represents a hydrogen atom, methyl group or ethyl group; R$^2$ and R$^3$ may be the same or different and each represent an alkyl group having 1 to 3 carbon atoms or phenyl group; R represents n-butyl group, cumyl group or benzyl group; m represent an integer of 0 to 4; and A represents a polymeric residual groups represented by General Formula (III) or (IV) shown below:

(III)

wherein $R^6$ represents an alkylene group having 2 to 4 or 6 carbon atoms; $R^7$ represents a hydrogen atom or ethyl group; and n is an integer of 1 to 1,000,

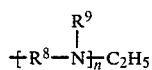 (IV)

wherein $R^8$ represents an alkylene group having 2 to 4 carbon atoms; $R^9$ represents a hydrogen atom or an alkyl group having 1 to 6 carbon atoms; and n is as defined above, and at least one polymer block having a repetitive unit represented by General Formula (VI):

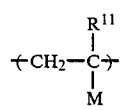 (VI)

wherein $R^{11}$ represents a hydrogen atom, methyl group or ethyl group; M represents at least one selected from the group consisting of a group represented by the formula $-CH=CH_2$, $-C(CH_3)=CH_2$, $-COOCH_3$ or $-COOC_2H_5$ and phenyl group, the process comprising steps of:

(1) synthesizing a block copolymer by successively addition polymerizing units represented by General Formula (VIII);

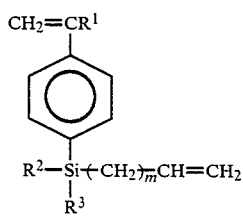 (VIII)

wherein $R^1$, $R^2$, $R^3$ and m are as defined above with at least one of the compounds represented by General Formula (IX);

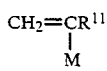 (IX)

wherein $R^{11}$ and M are as defined above by using an organic metallic compound as an initiator wherein at least the polymerization of the compound of General Formula (VIII) is carried out in the presence of N-methylpyrrolidine said block copolymer comprising a polymer block having a repetitive unit represented by General Formula (VII)

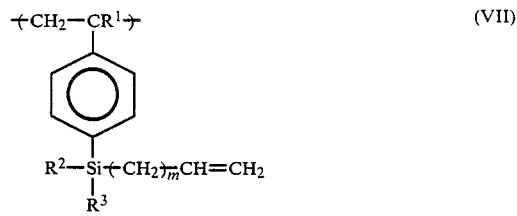 (VII)

wherein $R^1$, $R^2$, $R^3$ and m have the same meaning as in General Formula (I)

and at least one polymer block having a repetitive unit of General Formula (VI) shown above (2) converting the vinyl groups on the units of the block copolymer represented by General Formula (VII) into a carbanion by reacting the vinyl group with an organic alkali metal represented by the Formula RAlk wherein R has the same meaning as in General Formula (I) and Alk represents a sodium, lithium, potassium or cesium atom;

(3) synthesizing a cation-terminated polymer by subjecting a compound represented by General Formula (X):

 (X)

wherein $R^6$ is as defined above or a compound represented by General Formula (XI):

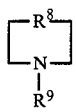 (XI)

wherein $R^8$ and $R^9$ are as defined above to cationic polymerization by using as an initiator a compound selected from the group consisting of boron trifluoride, boron trifluoride etherate, triethyloxonium tetrafluoroborate, ethylfluorosulfonate and ethyltrifluoromethylsulfonate; and (4) ionic coupling the carbanion and the cation-terminated polymer.

3. The process of according to claim 2, wherein the conversion of the vinyl group possessed in General Formula (VII) by said block copolymer, into the carbanion by using the organic alkali metal, is carried out in an ether solvent at 0° to 25° C.

4. The process according to claim 3, wherein said ether solvent is tetrahydrofuran.

5. The process according to claim 2, wherein said organic alkali metal used for forming the carbanion is n-butyl lithium or cumyl cesium.

6. The process according to claim 2, wherein the coupling is carried out by mixing a solution containing the block copolymer having the carbanion-terminated pendant group and a solution containing the cationterminated polymer, while maintaining the mixture at −78° to 0° C.

7. A process for producing a block-graft copolymer comprising a polymer block having a repetitive unit represented by General Formula (I):

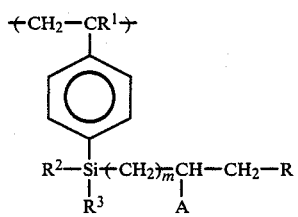
(I)

wherein $R^1$ represents a hydrogen atom, methyl group or ethyl group; $R^2$ and $R^3$ may be the same or different and each represent an alkyl group having 1 to 3 carbon atoms or phenyl group; R represents n-butyl group, cumyl group or benzyl group; m represent an integer of 0 to 4; and A represents a polymeric residual group represented by General Formula (II), (III) or (V) shown below:

(II)

wherein $R^4$ may be the same or different and each represent methyl group, ethyl group or phenyl group; $R^5$ is as defined for $R^4$ or represents a group represented by the formula $-Si(R^4)_3$ and n is an integer of 3 to 1,000,

(III)

wherein $R^6$ represents $-CH_2CH_2-$ or

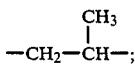

$R^7$ represents a hydrogen atom, an alkyl group having 1 to 4 carbon atoms, vinyl group or phenyl group; and n is an integer of 1 to 1,000,

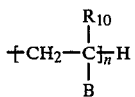
(V)

wherein $R^{10}$ represents a hydrogen atom or methyl group; B represents $-COOR^2$, where $R^2$ is as defined above, or $-CN$; and n is an integer of 1 to 1,000;
and at least one polymer block having a repetitive unit represented by General Formula (VI):

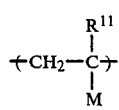
(VI)

wherein $R^{11}$ represents a hydrogen atom, methyl group or ethyl group; M represents at least one selected from the group consisting of $-CH=CH_2$, $-C(CH_3)=CH_2$, 13 $COOCH_2$, $-COOC_2H_5$ and phenyl group, the process comprising steps of:

(1) synthesizing a block copolymer by successively addition polymerizing units represented by General Formula (VIII)

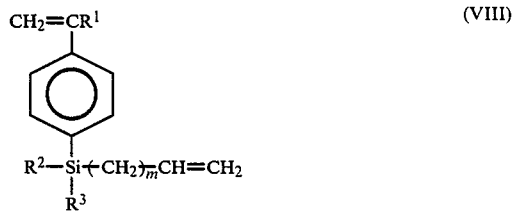
(VIII)

wherein $R^1$, $R^2$, $R^3$ and m are as defined above with at least one of the compounds represented by General Formula (IX);

(IX)

wherein $R^{11}$ and M are as defined above
by using an organic metallic compound as an initiator wherein at least the polymerization of the compound of General Formula (VIII) is carried out in the presence of N-methylpyrrolidine
said block copolymer comprising a polymer block having a repetitive unit represented by General Formula (VII)

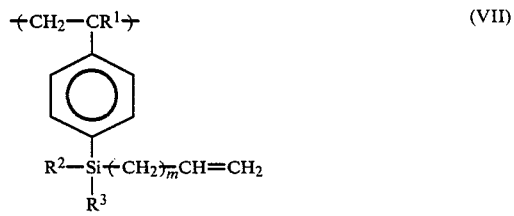
(VII)

wherein $R^1$, $R^2$, $R^3$ and m have the same meaning as in General Formula (I)
and at least one polymer block having a repetitive unit of General Formula (VI) shown above (2) converting the vinyl groups on the units of the block copolymer represented by General Formula (VII) into a carbanion by reacting the vinyl group in solution with an organic alkali metal represented by the Formula RAlk wherein R has the same meaning as in General Formula (I) and Alk represents a sodium, lithium, potassium or cesium atom;

(3) adding at least one of a monomeric compound represented by General Formula (XII);

(XII)

wherein $R^{10}$ and B are as defined above
or a monomeric compound represented by General Formula (XIII)

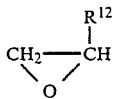

wherein $R^{12}$ represents a hydrogen atom or methyl group
or a monomeric compound represented by General Formula (XIV)

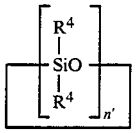

wherein $R^4$ is as defined above and $n'$ is 3 or 4
to the solution containing the block copolymer whose vinyl groups have been converted into carbanions; and (4) reacting the carbanion of the block copolymer with the monomeric compound to grow side chains from the carbanion.

8. The process according to claim 7, wherein the conversion of the vinyl group possessed in General Formula (VII) by said block copolymer, into the carbanion by using the organic alkali metal, is carried out in an ether solvent at 0° to 25° C.

9. The process according to claim 8, wherein said ether solvent is tetrahydrofuran.

10. The process according to claim 7, wherein said organic alkali metal used for forming the carbanion is n-butyl lithium or cumyl cesium.

11. The process according to claim 7, which is the process for producing the block-graft copolymer wherein the A in General Formula (I) is the polymeric residual group represented by General Formula (II), wherein the compound represented by General Formula (XIV) is added to the solution of the carbanion-formed block copolymer in the form of a solution in an ether solvent, and reacted at 0° to 65° C.

12. The process according to claim 7, which is the process for producing the block copolymer wherein the A in General Formula (I) is the polymeric residual group represented by General Formula (III), wherein the compound represented by General Formula (XIII) is added to the solution of the carbanion-formed block copolymer in the form of a gas, and reacted at 30° to 65° C.

13. The process according to claim 7, which is the process for producing the block copolymer wherein the A in General Formula (I) is the polymeric residual group represented by General Formula (V), wherein the compound represented by General Formula (XII) is added in the form of a gas or as a solution in an ether solvent, and reacted at −78° to −20° C.

14. An oxygen enrichment membrane comprising the block-graft copolymer according to claim 1, wherein A in General Formula (I) is General Formula (II).

* * * * *